US007949191B1

(12) United States Patent
Ramkumar et al.

(10) Patent No.: US 7,949,191 B1
(45) Date of Patent: May 24, 2011

(54) METHOD AND SYSTEM FOR SEARCHING FOR INFORMATION ON A NETWORK IN RESPONSE TO AN IMAGE QUERY SENT BY A USER FROM A MOBILE COMMUNICATIONS DEVICE

(75) Inventors: Gurumurthy D Ramkumar, Palo Alto, CA (US); Raghavan Manmatha, Belchertown, MA (US); Supratik Bhattacharyya, Mountain View, CA (US); Gautam Bhargava, Palo Alto, CA (US); Mark Ruzon, Mountain View, CA (US)

(73) Assignee: A9.Com, Inc., Palo Alto, CA (US)

( * ) Notice: Subject to any disclaimer, the term of this patent is extended or adjusted under 35 U.S.C. 154(b) by 1084 days.

(21) Appl. No.: 11/732,858

(22) Filed: Apr. 4, 2007

(51) Int. Cl.
*G06K 9/62* (2006.01)

(52) U.S. Cl. ........ 382/209; 382/305; 382/190; 382/232; 382/224; 707/100; 709/219

(58) Field of Classification Search .................. 382/173, 382/176, 190, 181, 224, 209, 305; 707/100, 707/3, 6; 709/219
See application file for complete search history.

(56) References Cited

U.S. PATENT DOCUMENTS

| 7,508,998 | B2 * | 3/2009 | Shiiyama | 382/305 |
| 7,660,468 | B2 * | 2/2010 | Gokturk et al. | 382/224 |
| 2007/0047819 | A1 * | 3/2007 | Hull et al. | 382/190 |
| 2007/0133874 | A1 * | 6/2007 | Bressan et al. | 382/181 |
| 2007/0226321 | A1 * | 9/2007 | Bengtson | 709/219 |
| 2008/0162474 | A1 * | 7/2008 | Thong et al. | 707/6 |

\* cited by examiner

*Primary Examiner* — Brian Q Le
*Assistant Examiner* — Ali Bayat
(74) *Attorney, Agent, or Firm* — Kilpatrick Townsend & Stockton LLP

(57) ABSTRACT

Image-based searching for information on a network is provided in response to an image query sent by a user. The image query includes an image captured using a mobile communications device with a camera. The image is processed to detect any text present in the image, and any detected text can be analyzed using a process such as optical character recognition (OCR). The analyzed text is used to search for matches in at least one corresponding domain database, selected from various domain databases present in the network. Thereafter, one or more selected matches and any additional related information can be sent to the user as one or more results for the submitted image query.

15 Claims, 6 Drawing Sheets

METHOD AND SYSTEM FOR SEARCHING FOR INFORMATION ON A NETWORK IN RESPONSE TO AN IMAGE QUERY SENT BY A USER FROM A MOBILE COMMUNICATIONS DEVICE

BACKGROUND OF THE INVENTION

The present invention relates in general to searching for information on a network, in response to an image query sent by a user from a mobile communications device with a camera. In particular, the invention relates to the process of searching for information corresponding to the text in the image query on the network.

A network includes a group of domain databases. The network is accessed by the user, using a communication medium, with a mobile communications device. Each of the domain databases has an information log with specific information. For example, in case of a product search, the specific information may include the product tag, the price tag, the store label or other identifying information related to the product.

The user searches the network for the specific information by using the mobile communications device. Examples of the mobile communications device include mobile phone, personal digital assistant (PDA), and the like. The mobile communications device provides the user with the facility of communicating within the network. Moreover, the mobile communications device can capture images. However, the images, captured by the mobile communications device, may be poor in quality. For example, the images may have poor contrast, poor resolution, may be blurred, and may have intensity variations. Thus extracting information from these images to use as an image query is challenging and error prone. For example, text detection and recognition from such poor quality images often produces a number of errors.

A search must, therefore, be robust to errors produced in the text extracted from the images. Additionally, the search must be rapidly done even if the queries are long (usually queries may vary in length from a few words to a few hundred words). For example, a store or product label may have a lot of extra information about the product besides the brand and model numbers. It may include detailed specifications. Such information along with the text extraction errors makes the queries long and poorly specified and can reduce the accuracy of the search if not properly handled.

There are several methods for searching for information on the network. One such method involves the use of image based searches. The image based searches involve searching for information corresponding to an image captured by a mobile communications device in one of the domain databases. This domain database is selected based on the image. The method retrieves and sends the identified results corresponding to the image to the user. However, the method only searches for matches corresponding to the image in the domain database and does not carry out searches for the contents present in the image. For example, an image may include a logo of a company and a textual part as well. The image based search searches for exact matches corresponding to the specified logo of the company. Valuable information such as company name or address that may be included in the textual part is not found by the image based search. Further, any background will confuse the image based search. Hence, the image based search is incapable of searching for content which is not pre-specified in the image database or collection. In the context of this application, the "content" is only a portion of the image. The portion of the image may include logos of companies, alphanumeric characters of some language, product labels of the products, and the like. The alphanumeric characters in the image can be written in any of the languages, such as English, Chinese, French, and Spanish. Further, the image based search is incapable of detecting matches for the text present in the image.

In light of the foregoing discussion, there is a need for a method and system for searching information that automatically searches in a domain database, based on the content information of the image. In this application, the "content information" is the text present in the image and the information about the text geometry such as size, and location of the text present in the image. For example, if an image includes text, then the content information includes information pertaining to the text, i.e. ASCII or Unicode interpretation of the text, and the size and location of the text within the image. Such a method and system would eliminate the necessity of editing or writing keywords to search for the specific information on the network. This would make the method for searching for information considerably simpler, as well as automatic. Further, the method would include detection and recognition of the text in the image and a search for matches corresponding to the detected and recognized text in the domain database.

SUMMARY OF THE INVENTION

An object of the present invention is to provide a method and system for automatically detecting and recognizing text and simultaneously searching for information on a network in response to an image query sent by a user even when the image is poor in quality or blurred or with intensity variations across the different regions of the image since the image has been captured by using a mobile communications device with a camera.

Another object of the present invention is to provide a method and system that eliminates the need for editing or writing the text which is the basis of the user's search for information. Such a method and system would eliminate the need for tedious process of editing and writing the text.

Yet another object of the present invention is to provide a method and system that facilitates automatic detection and correction of errors in the text present in an image.

Various embodiments of the present invention provide a method and system for automatically searching for the information on the network in response to an image query sent by a user. The content information of the image is processed to detect the text geometry information of the image. The text present in the image is detected by using the detected text geometry information of the image. This text may be written in any of languages for example, English, Chinese, Spanish, and French. The matches corresponding to the detected text present in the image are then searched for matches on the network. Subsequently, a selected set of identified matches along with comparative pricing information from different vendors is sent to the user.

BRIEF DESCRIPTION OF THE DRAWINGS

The embodiments of the present invention will hereinafter be described in conjunction with the appended drawings that are provided to illustrate and not to limit the present invention, wherein like designations denote like elements, and in which.

DETAILED DESCRIPTION OF THE INVENTION

Various embodiments of the present invention relate to a method, system and computer program product for searching for information on a network in response to an image query sent by a user. This image query includes an image captured by the user by using a mobile communications device with a camera. The image can either be a colored or a black and white image. The mobile communications device is usually equipped with a low-quality camera. Therefore, the image captured by using this low-quality camera may be poor in quality since it could be blurred or have intensity variations. This image is sent by the user as an image query to a communication server using a communication medium. The text present in the image is detected and recognized by an image processing module. Subsequently, matches for the detected text are searched for in a domain database, Selected from a group of domain databases present on the network. The domain database is selected, based on the image query. Subsequently, the identified matches are sent to the user.

Figure 1:
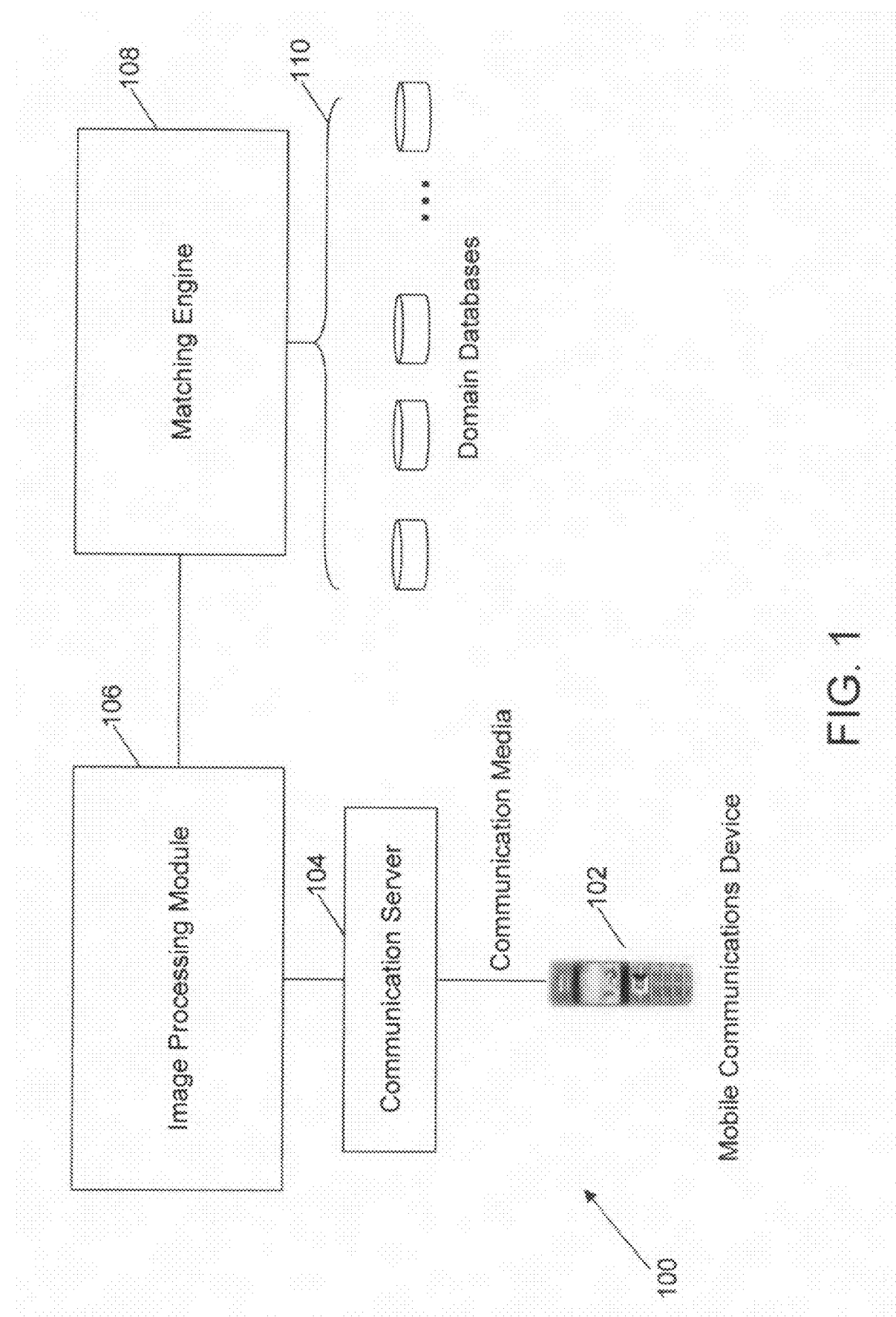
FIG. 1 is a block diagram illustrating a system, wherein various embodiments of the present invention can be practiced.

FIG. 1 is a block diagram illustrating a network 100, where various embodiments of the present invention can be practiced. Network 100 includes a mobile communications device 102, a communication server 104, an image processing module 106, a matching engine 108, and various domain databases 110. Mobile communications device 102 is a portable computational device with a camera and is capable of capturing images and sending them as image queries. Examples of mobile communications device 102 include mobile phone, personal digital assistant (PDA), and the like. The images captured by mobile communications device 102 may be poor in quality, blurred or have high-intensity variations. The image query can be an image of products, product packaging with product model codes or store labels including text and image of the product, for which the user wants information. Examples of such information include product prices, product store locations, UPC's, product tag information, and the like. Similarly, the image query may be a street sign or a store sign.

The user, using mobile communications device 102, captures an image and sends it as an image query to communication server 104. This eliminates the need for writing or editing the query by using a keyboard or numeric keypad. Additionally, an image-based query saves time and eliminates the tedious work of writing or editing the text. Communication server 104 is capable of handling user queries and sending the results to the user. The user queries are stored and queued in communication server 104. The mobile communications device 102 communicates with communication server 104 by using the communication medium. Examples of the communication medium include an email, a file transfer protocol (FTP) server, a short message service, a multimedia service (MMS), and the like. Communication server 104 sequentially receives the image query from mobile communications device 102 and sends the image query to image processing module 106.

Image processing module 106 processes the content information of the image to detect the text. The content information is used to extract the text geometry information. The text geometry information includes information pertaining to the geometry (boundary or periphery) of the text and the location of the text present in the image. Subsequently, image processing module 106 automatically detects the text present in the image by using the text geometry information. The text may include a group of words, which is sent to matching engine 108.

Matching engine 108 searches for matches of the group of words in a domain database. The search for matches can be based on an N-gram-based algorithm. The N-gram based algorithm is described in detail in conjunction with FIGS. 5A and 5B. A domain database is chosen from various domain databases 110, based on the image query. For example, if the user sends an image of a price tag of a product as the image query, one of the various domain databases 110 that contain information pertaining to the cost of the product is searched for matches corresponding to the image of the price tag. Each of various domain databases 110 includes information pertaining to a specific feature of the product. Examples of the product features include price information, location information in a selling store, product technical-specification information, and the like. Subsequently, a set of selected identified matches and their comparative price information from different vendors is sent to the user. If the user instead sends a picture of a street sign or a store sign then one of the domain databases 110 corresponding to addresses is searched for matches corresponding to the image of the street sign or store sign. Subsequently, the matches along with their addresses information are sent to the user.

Figure 2:
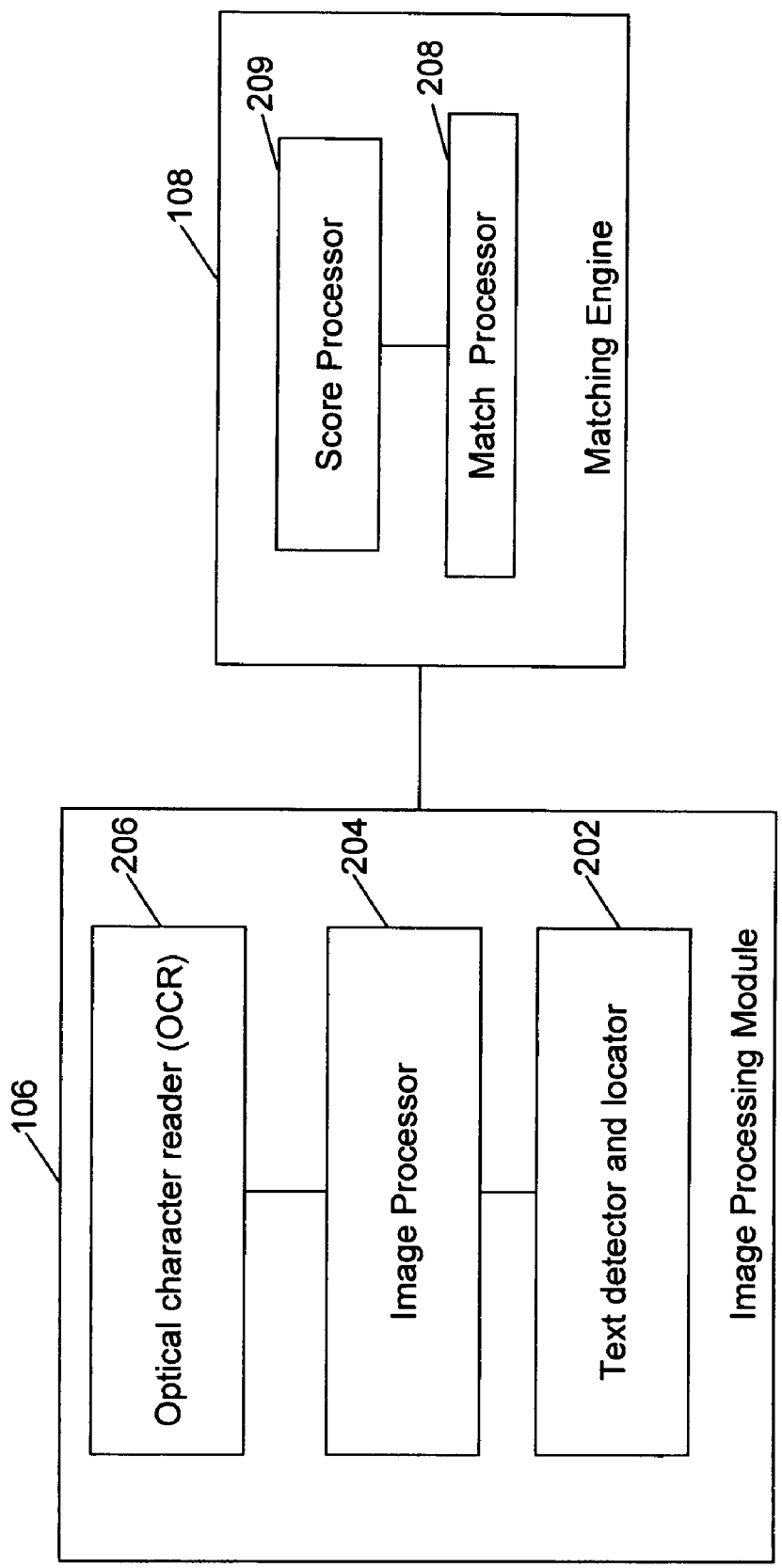
FIG. 2 is a block diagram illustrating an image processing module and a matching engine, along with their elements, in accordance with an embodiment of the present invention.

In accordance with an embodiment of the present invention, the user's query may include an image and information pertaining to the preferred domain database in which the search needs to be performed. The information of the preferred domain database is sent to communication server 104 and thereby, a search for the matches is performed in the preferred domain database. For example, if a user wants to know price information of a shoe of a specific brand, say XYZ, then the user can send a picture of the product code of the XYZ shoe. The database for getting the required price information of the XYZ shoe can then be selected by matching engine 108. Subsequently, the detected words in the image are searched for matches corresponding to them in the preferred domain database FIG. 2 is a block diagram illustrating an image processing module 106 and a matching engine 108 along with their elements, in accordance with an embodiment of the present invention. Image processing module 106 is connected to matching engine 108. Image processing module 106 includes a text detector and locator 202, an image processor 204, and an optical character reader (OCR) 206. Text detector and locator 202 indicate the location of the various pieces of text present in the image. Image processor 204 improves the quality of the text within the image locations indicated by text detector and locator 202 by applying various mathematical algorithms on the image. For example, an adaptive image normalization algorithm, one of the mathematical algorithms, may be used to improve the quality of the text image. The adaptive image normalization algorithm improves the intensity variations of the text image. This is explained in detail in steps 502-506 of FIGS. 5A and 5B.

Image processor 204 automatically detects the text and encodes the text geometry information, including the location of the text and boundary information, by processing the content information of the image. Additionally, the text present in the image is automatically converted to a binary form and transferred to OCR 206. The text geometry information indicates to OCR 206 which portion of the image should be processed. OCR 206 recognizes the group of words in the text present in the image.

The accuracy and performance of OCR 206 are better when there is a large contrast between text on the image and background of the text. In addition, variation in illumination or the intensity of the characters causes a decrease in accuracy and performance of OCR 206. To solve these problems, the portions of the image containing text are transformed to improve the quality of the image. An example of such a transformation is adaptive image normalization. After the transformation, OCR 206 automatically detects the group of words in the text.

OCR 206 sends the group of words in the text to matching engine 108. Matching engine 108 includes a match processor 208 and a score processor 209. Match processor 208 and score processor 209 are explained in detail later.

Figure 3:
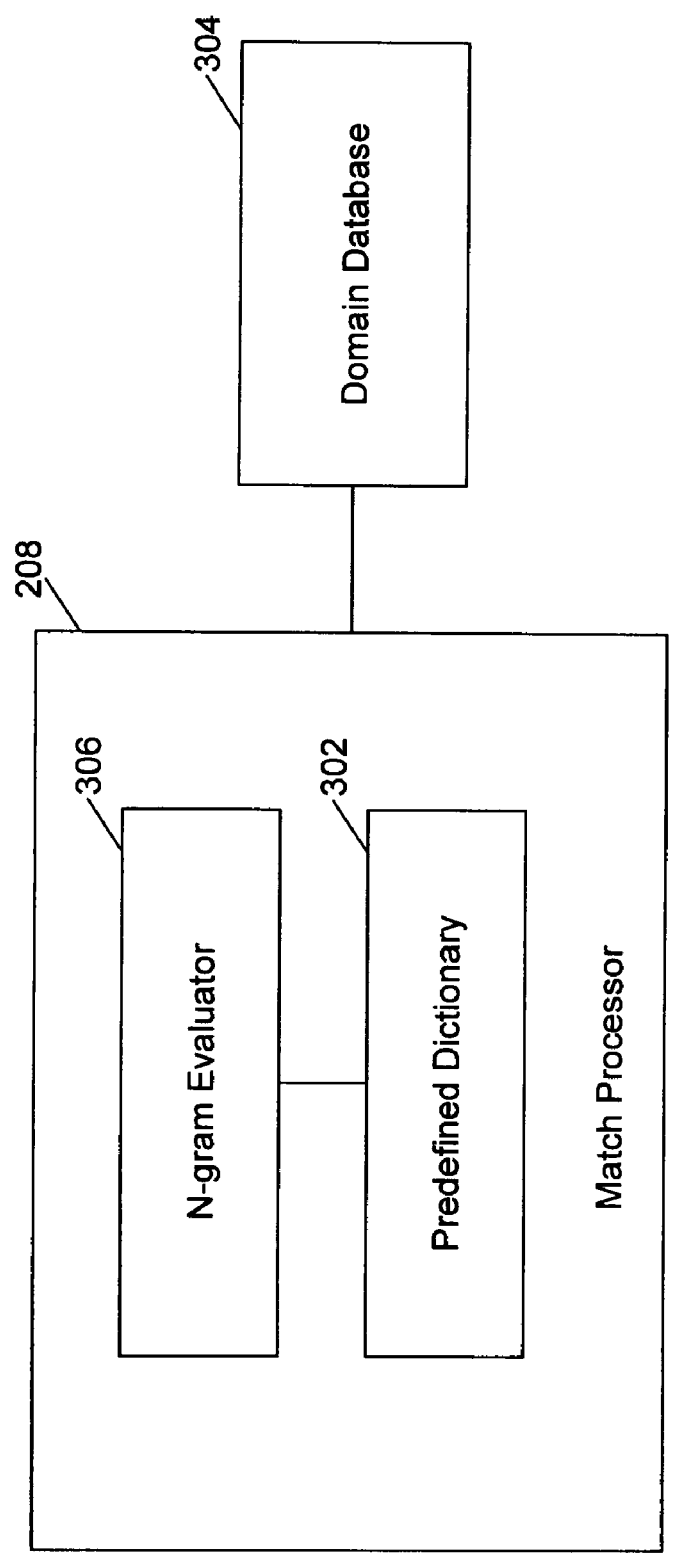
FIG. 3 is a block diagram illustrating a match processor along with its elements, in accordance with an embodiment of the present invention.

FIG. 3 is a block diagram illustrating match processor 208 along with its elements, in accordance with an embodiment of the present invention. Match processor 208 includes a pre-defined dictionary 302 and an N-gram evaluator 306. Pre-defined dictionary 302 includes a list of selected words. Pre-defined dictionary 302 is used to filter out words in the output of OCR 206 which are not useful words for matching for the searching of some specific information. For example, in a business card application, the name of the person is not useful in searching for the address of the business.

Domain database 304 includes a list of domain specific information. For example, in case of product searches it may include a list of products with information on each product such as the model number, brand name, UPC codes, name of the product, price and the like. In the case of addresses, it may include information regarding building and apartment numbers, street names, city names, country names, zip codes and the like.

N-gram evaluator 306 extracts and matches N-grams of words in the text and also in domain database 304. Domain database 304 is selected from various domain databases 110. Domain database 304 is selected based on the domain specific information, needed for searching the matches. The N-gram of a piece of text is a set of subsequences of a predefined number of alphanumeric characters present in the piece of text after removing all the spaces between the alphanumeric characters in the piece of text. For example, the 3-grams, also known as trigrams, in the word 'IMAGE' are: 'IMA', 'MAG', and 'AGE' and the 4-grams in the word 'IMAGE' are WAG', and WAGE'. N-gram evaluator 306 searches for matches in one of the various domain databases 110, which is selected based on the image query.

For example, if the user's image query relates to the schedule information of a particular train, the search is performed by matching engine 108 in one of the various domain database 110 such that the selected domain database has the information pertaining to the schedules of trains. The identified matches are determined and ranked by using the N-gram count of the group of words of the train station name. The N-gram count is calculated for each of the group of words of the train station name. The found matches are ranked, based on the level of the similarity of matches with the group of words present in the text. N-gram evaluator 306 calculates the N-gram count counting the N-grams in common between the group of words and the candidate match. The calculated N-gram counts are normalized and weighted to produce a score. The N-gram matching is usually done separately for each field. For example, in a product database, the N-gram matching is done separately over the brand name, the model number, the UPC code, and the like. Similarly, for addresses, N-gram matching may be done separately over the city and street names. One can also create a single field including city field and street name field if one wants to do a combined search.

The output of N-gram evaluator 306 is a set of potential matches over various fields. The output potential matches are sent to score processor 209. Score processor 209 uses a scoring function to weight the output potential matches corresponding to the various fields. As a result, score processor 209 assigns each output potential match a final score. Score processor 209 may also get input from domain database 304 in assigning the final score. In one example, the scoring function used by score processor 209 is a linear combination of the scores of different fields from N-gram evaluator 306. The weights for the linear combination are determined either by training or by hand. Thus, if N-gram evaluator 306 returned scores for the brand name and the model number, score processor 209 will produce a combined score for both of them. The scores produced by score processor 209 are used to rank the output potential matches. The output potential matches, based on such calculations and comparisons, are selected by matching engine 108. Additionally, matching engine 108 may obtain comparative pricing information from different vendors for comparing the prices. Thereafter, matching engine 108 sends the top matches and comparative prices to the user via communication server 104.

Figure 4:
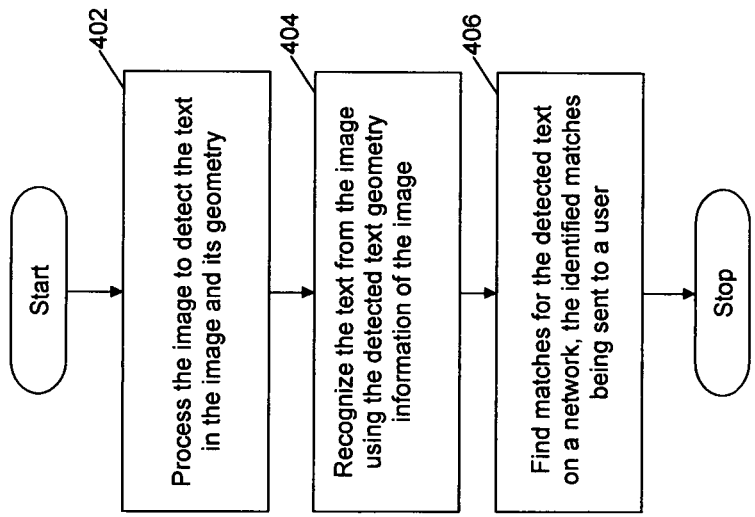
FIG. 4 is a flowchart illustrating the steps for searching for information on a network in response to an image query sent by a user in accordance with an embodiment of the present invention.

FIG. 4 is a flowchart illustrating the steps for searching for information on network 100 in response to the image query sent by the user in accordance with an embodiment of the present invention. The image query is received by communication server 104. Communication server 104 forwards the image query to image processing module 106 in the form of an image. At step 402, text detector and locator 202 automatically detect the text in the image and extracts the text geometry information by processing the content information of the image. The text geometry includes information pertaining to the bounding areas where the text is present in the image and the location of the text in the image. At step 404, OCR 206 automatically recognizes the text from the image by using the text geometry information. Subsequently, the detected text is sent to matching engine 108. At step 406, matching engine 108 searches for matches for the detected text in a corresponding domain database. The corresponding domain database 110 is selected based on the image query. Subsequently, the identified matches along with comparative pricing information are sent to the user via communication server 104.

Figure 5A:
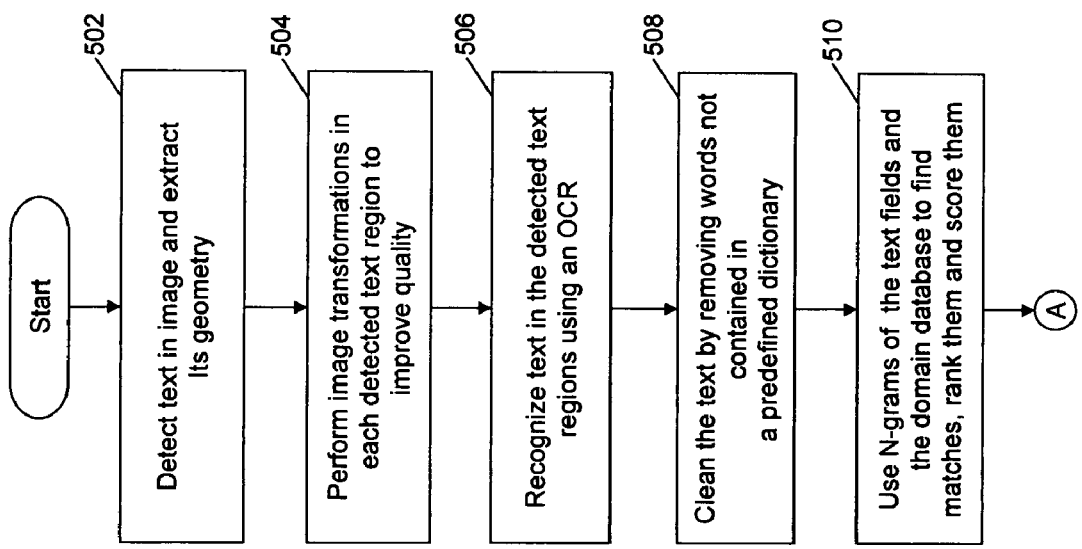
FIGS. 5A and 5B are a flowchart illustrating the detailed steps for searching for the information on a network in response to an image query sent by a user in accordance with another embodiment of the present invention.
Figure 5B:
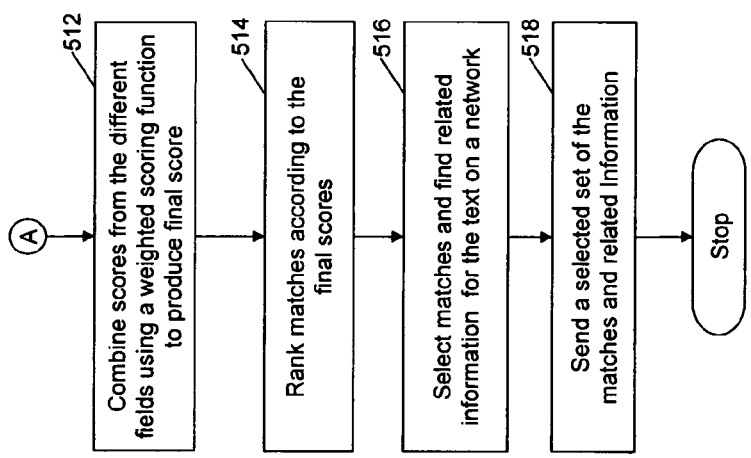

FIGS. 5A and 5B are a flowchart illustrating the detailed steps for searching for information on network 100 in response to the image query sent by the user in accordance with another embodiment of the present invention. At step 502, text detector and locator 202 detects the text in the image and the corresponding text geometry information in the image obtained as an image query. At step 504, image processor 204 is then used to improve the quality of the detected text regions using different image processing algorithms. An example of such an algorithm is adaptive image normalization.

At step 506, the words in the text image are automatically recognized by OCR 206. OCR 206 is applied to the detected text regions using the detected text geometry information.

At step 508, matching engine 108 cleans the text by removing words not contained in a predefined dictionary. At step 510, match processor 208 counts the number of N-grams in common between the output of the text from step 508 and each product in the domain database. The counted N-grams are normalized to create a score. The matches are ranked based on the created score. The N-gram matching allows partial matching so that even if words are incorrectly spelled they can still be found. At this step, match processor 208 scores each field separately. At step 512, score processor 209 does a weighted combination of the scores from different fields to produce the final scores. At step 514, each of the products in the domain database selected from various domain databases 110 is ranked based on the final scores. At step 516, matching engine 108 selects matches and finds related information such as prices, reviews, and the like, from the domain database for these products. At step 518, a selected list of matches is returned to the user by matching engine 108 via communication server 104.

In accordance with an embodiment, the present invention can be used as a shopping assistant. In this application, the user's query includes an image of a store label, a product tag or a price tag, or other identifying information on the product. The image query is processed by image processing module 106 to detect the text in the image. Information is searched for relating to the closest product matches from the internet, including their price, from highly rated vendors. Subsequently, the identified information is sent to the user.

In accordance with another embodiment, the present invention can be used in a language translator. In this application, the user's image query includes the image of the text written in a particular language. The image query is processed by image processing module 106 to detect the text in the image. The translation of the text from the particular language to a preferred language is searched by matching engine 108. Subsequently, the identified translated version of the text is sent to the user.

In accordance with yet another embodiment, the present invention can be used in an encyclopedia or a dictionary lookup service. In this application, the user's image query includes an image of a phrase or a word. The image query is processed by image processing module 106 to detect the phrase or the word in the image. The information relating to the phrase or the word is searched by matching engine 108. Examples of the information pertaining to a word or a phrase include the definition, description or the etymology of the word or the phrase. Subsequently, the identified information is sent to the user.

In accordance with yet another embodiment, the present invention can be used in a business lookup application. In this application, the user's image query includes the image of a sign or the name of a business on a street. The image query is processed by image processing module 106 to detect the sign or the name of business on the street. The information pertaining to the location of the business as well as the phone number, the hours and the direction of the business is searched by matching engine 108. Subsequently, the identified information is sent to the user.

In accordance with yet another embodiment, the present invention can be used in a transportation schedule finder. In this application, the user's image query includes the image of a sign or the name of train or bus station or location. The image query is processed by image processing module 106 to detect the sign or name of train. The information pertaining to the schedule of the next arriving bus or train is searched by matching engine 108. Subsequently, the identified information is sent to the user.

Various embodiments of the present invention relate to a method and system for searching for information on a network in response to an image query sent by a user. Such a method and system eliminates the need for editing or writing the text about which the user wants to search for information. The search is made easier and faster by eliminating the tedious task of writing or editing the text. Further, the present invention facilitates automatic detection and correction of misspelled words in the detected text of an image.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions into the computer system.

The computer system executes a set of instructions that are stored in one or more storage elements, to process input data. The storage elements may also hold data or other information, as desired. The storage elements may be an information source or physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program, or a portion of a program module. The software might also include modular programming in the form of object-oriented programming. Processing of input data by the processing machine may be in response to user commands, to the results of previous processing, or to a request made by another processing machine.

While the embodiments of the invention have been discussed and described, the invention is not limited to these embodiments only. A number of changes and modifications can be thought of without moving away from the scope of the invention, as discussed in the claims.

What is claimed is:

1. A computer-implemented method for searching for information on a network in response to an image query sent by a user, comprising:

under control of one or more computer systems configured with executable instructions, receiving an image query sent from a mobile communications device, the image query including at least one image taken using a camera of the mobile communications device;

processing the at least one image to detect any text present in the at least one image and to determine geometry information pertaining to the text, the geometry information including at least one of position and geometry information for the text in the at least one image;

automatically recognizing the text from at least one portion of the at least one image corresponding to the geometry information of the image;

determining matches for the detected text in at least one domain database on the network, the at least one domain database selected based at least in part upon the image query by;

removing words in the text that are not present in a pre-identified dictionary;

performing an N-gram match by counting a number of N-grams in common between the text and each field of every entry in the at least one domain database, the at least one domain database being selected from various domain databases;

normalizing a count of the matching N-grams to return a score for each field of every entry in the at least one domain database;

determining weighted combinations of the scores from multiple fields to compute a final score for every entry in the at least one domain database;

ranking entries in the at least one domain database based on the final scores; and retrieving relevant information for one or more top-ranked entries in the at least one domain database; and sending one or more of the identified matches to the mobile device for display to the user.

2. The method of claim 1, wherein the network includes a plurality of domain databases, and wherein the image query further comprises a text query portion along with the image, the text query portion including information corresponding to one of the plurality of domain databases.

3. The method of claim 1, wherein the image is one of a black and white image and a colored image.

4. The method of claim 1, wherein processing the at least one image further comprises transforming the image to improve a quality of the image, and wherein automatically recognizing the text comprises using at least one optical character recognition process on the at least one portion of the at least one image.

5. The method of claim 4, wherein the quality of the image is improved using an adaptive image normalization algorithm.

6. A computer-implemented method for searching for information on a network in response to an image query sent by a user, comprising:

under control of one or more computer systems configured with executable instructions, receiving an image query from a user, the image query including at least one image captured by the user;

detecting a presence of text in the at least one image and extracting geometry information corresponding to the text, the geometry information including at least one of a position of the detected text in the at least one image and a size of the detected text;

transforming the image to improve a quality of the image;

recognizing the detected text in at least one portion of the image using an optical character recognition (OCR) process, the at least one portion determined at least in part using the geometry information;

matching the recognized text to a plurality of words in a domain database based at least in part on an N-gram based matching algorithm by:

removing words in the text that are not present in a pre-identified dictionary;

performing an N-gram match by counting a number of N-grams in common between the text and each field of every entry in at least one domain database, the at least one domain database being selected from various domain databases;

normalizing a count of the matching N-grams to return a score for each field of every entry in the at least one domain database;

determining weighted combinations of the scores from multiple fields to compute a final score for every entry in the at least one domain database;

ranking entries in the at least one domain database based on the final scores; and retrieving relevant information for one or more top-ranked entries in the at least one domain database; and sending one or more of the words matching the recognized text to the user as identified matches.

7. A system for searching for information on a network in response to an image query sent by a user, the system comprising:

a communication server operable to receive an image query from a user, the image query including at least one image captured by a user and transmitted using a mobile communications device;

an image processing module operable to process the at least one image to determine text geometry information of the image corresponding to text detected in the image, the image processing module further operable to recognize the text in at least one portion of the at least one image determined based at least in part upon the text geometry information; and a matching engine operable to determine matches for the recognized text on at least one domain database for a network by:

removing words in the text that are not present in a pre-identified dictionary;

performing an N-gram match by counting a number of N-grams in common between the text and each field of every entry in at least one domain database, the at least one domain database being selected from various domain databases;

normalizing a count of the matching N-grams to return a score for each field of every entry in the at least one domain database;

determining weighted combinations of the scores from multiple fields to compute a final score for every entry in the at least one domain database;

ranking entries in the at least one domain database based on the final scores; and retrieving relevant information for one or more top-ranked entries in the at least one domain database, wherein the communication server is further operable to send one or more of the determined matches to the user in response to the image query.

8. The system according to claim 7, wherein the image query is received through a medium selected from the group consisting of an e-mail, a File Transfer Protocol (FTP) server, a message, and a Multi Media Service (MMS).

9. The system according to claim 7, wherein the image processing module comprises:

an image processor operable to locate and determine the geometry information in the at least one image; and an optical character recognition (OCR) module operable to recognize the text from the at least one image.

10. The system according to claim 7, wherein the matching engine comprises a match processor and a score processor, the match processor operable to evaluate N-gram based matches between the detected text and entries in a domain database, the score processor operable to compute a final score for each entry in the domain database based on a commonality of N-gram matches between the recognized text and the entries.

11. The system according to claim 10, wherein the match processor further comprises:
 a pre-defined dictionary including a plurality of words having at least one common aspect; and
 an N-gram evaluator operable to extract and match N-grams of words in the recognized text.

12. A non-transitory computer-readable storage medium having a computer readable program code embodied therein for searching for information on a network in response to an image query sent by a user, the computer readable program code when executed by at least one processor causing the at least one processor to:
 receive an image query sent from a mobile communications device, the image query including at least one image;
 process the at least one image to detect any text present in the at least one image and to determine geometry information pertaining to the text, the geometry information including at least one of position and geometry information for the detected text;
 automatically recognize the text from at least one portion of the at least one image corresponding to the geometry information of the image;
 determine matches for the detected text in at least one domain database on the network, the at least one domain database selected based at least in part upon the image query by;
  removing words in the text that are not present in a pre-identified dictionary;
  performing an N-gram match by counting a number of N-grams in common between the text and each field of every entry in the at least one domain database, the at least one domain database selected from various domain databases;
  normalizing a count of the matching N-grams to return a score for each field of every entry in the at least one domain database;
  determining weighted combinations of the scores from multiple fields to compute a final score for every entry in the at least one domain database;
  ranking entries in the domain database based on the final scores; and
  retrieving relevant information for one or more top-ranked entries in the at least one domain database; and
 send one or more of the identified matches to the mobile device for display to the user.

13. The non-transitory computer-readable storage medium of claim 12, wherein the network includes a plurality of domain databases, and
 wherein the image query further comprises a text query portion along with the image, the text query portion including information corresponding to one of the plurality of domain databases.

14. The non-transitory computer-readable storage medium of claim 12, wherein the image is a black and white image or a color image.

15. The non-transitory computer-readable storage medium of claim 12, wherein the quality of the image is improved using an adaptive image normalization algorithm.

\* \* \* \* \*